United States Patent

Buckley

[11] Patent Number: 4,799,848
[45] Date of Patent: Jan. 24, 1989

[54] ADJUSTABLE CONTROL STATION FOR AIRCRAFT LOADER

[75] Inventor: Margaret M. Buckley, Orlando, Fla.

[73] Assignee: FMC Corporation, Chicago, Ill.

[21] Appl. No.: 44,274

[22] Filed: Apr. 30, 1987

[51] Int. Cl.$^4$ .............................. B60P 1/02
[52] U.S. Cl. ............................ 414/347; 180/89.13; 182/62.5; 182/113; 414/351; 414/353; 414/495
[58] Field of Search ............... 414/345, 347, 351-353, 414/495, 508, 749, 522; 182/62.5, 113; 180/89.13

[56] References Cited

U.S. PATENT DOCUMENTS

| | | | |
|---|---|---|---|
| 2,798,652 | 7/1957 | Easton | 182/113 X |
| 3,352,380 | 11/1967 | Barney | 182/62.5 X |
| 3,489,300 | 1/1970 | McCartney et al. | 414/351 |
| 3,596,788 | 8/1971 | Willie | 414/522 X |
| 3,666,127 | 5/1972 | Guyaux | 414/351 X |
| 3,687,321 | 8/1972 | Goodhart et al. | 414/522 X |
| 3,944,277 | 3/1976 | Cyphert | 180/89.13 X |
| 4,682,666 | 7/1987 | Klee et al. | 180/89.13 |

FOREIGN PATENT DOCUMENTS

| | | | |
|---|---|---|---|
| 2905236 | 8/1980 | Fed. Rep. of Germany | 414/495 |
| 2105296 | 3/1983 | United Kingdom | 414/522 |

Primary Examiner—Leslie J. Paperner
Assistant Examiner—David A. Bucci
Attorney, Agent, or Firm—A. J. Moore; H. M. Stanley; R. B. Megley

[57] ABSTRACT

An adjustable control station for an aircraft loader for transferring containers between a controllably driven loader conveyor and a conveyor in cargo aircrafts of different sizes. The control station includes a unique movable platform constructed of three easily assembled major components including a stationary support structure and a movable platform which supports a console with front and rear control panels thereon. The movable platform is moved to a position close to the aircraft thereby enabling an operator thereon to simultaneously actuate controls for the loader conveyor and the aircraft conveyor while observing the containers movement. A front rail of a handrail may be vertically adjusted.

5 Claims, 7 Drawing Sheets

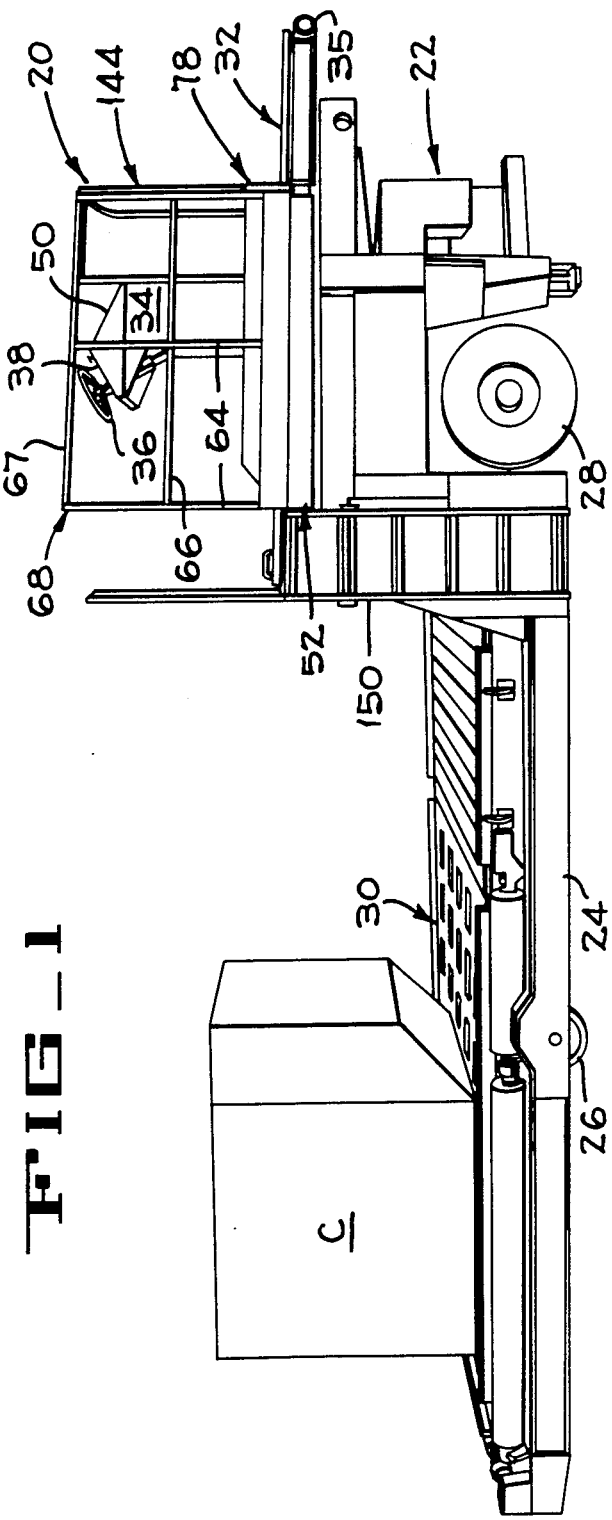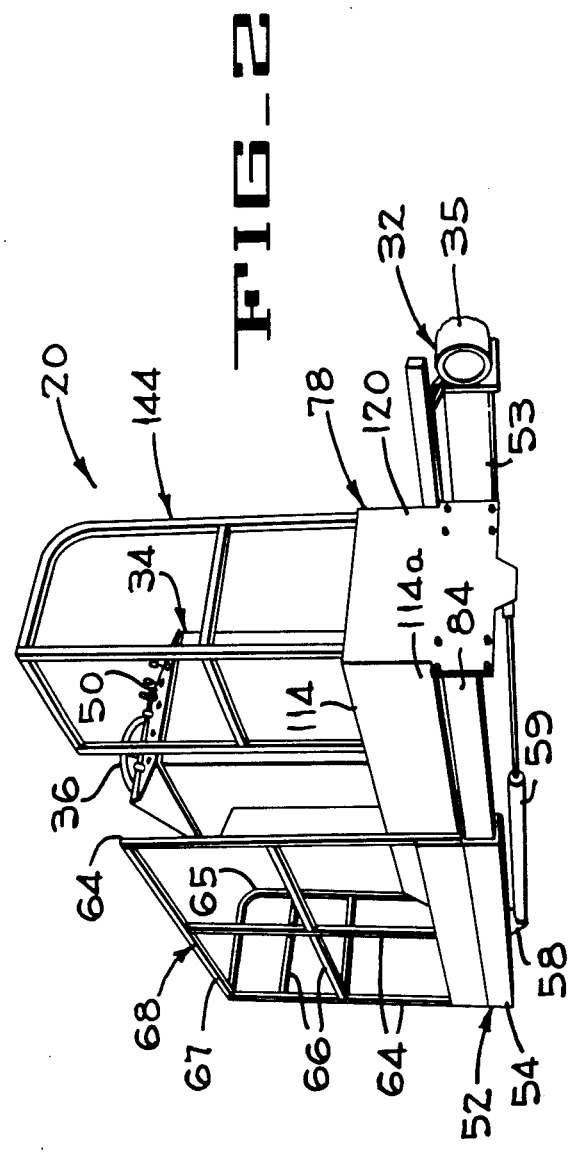

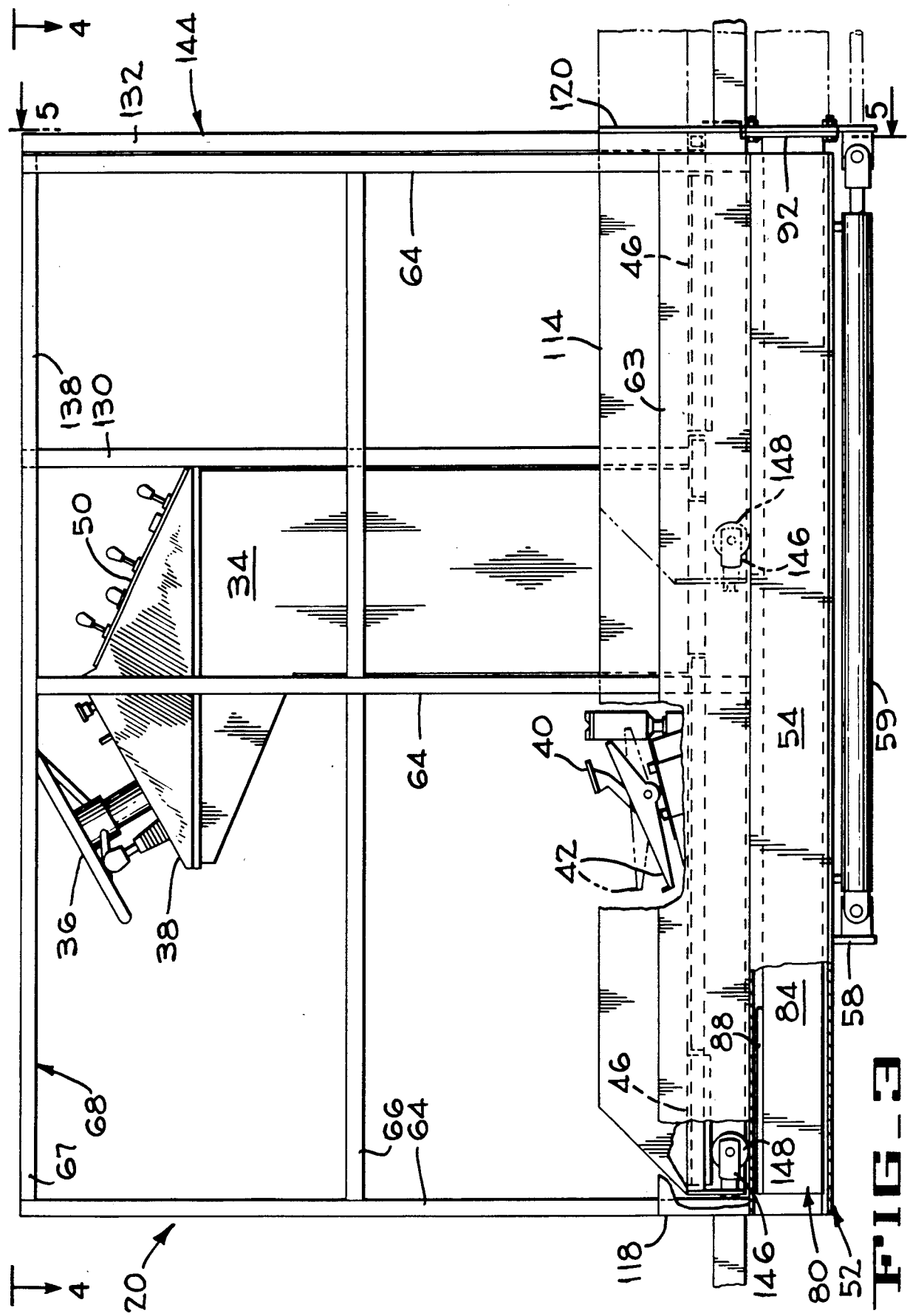

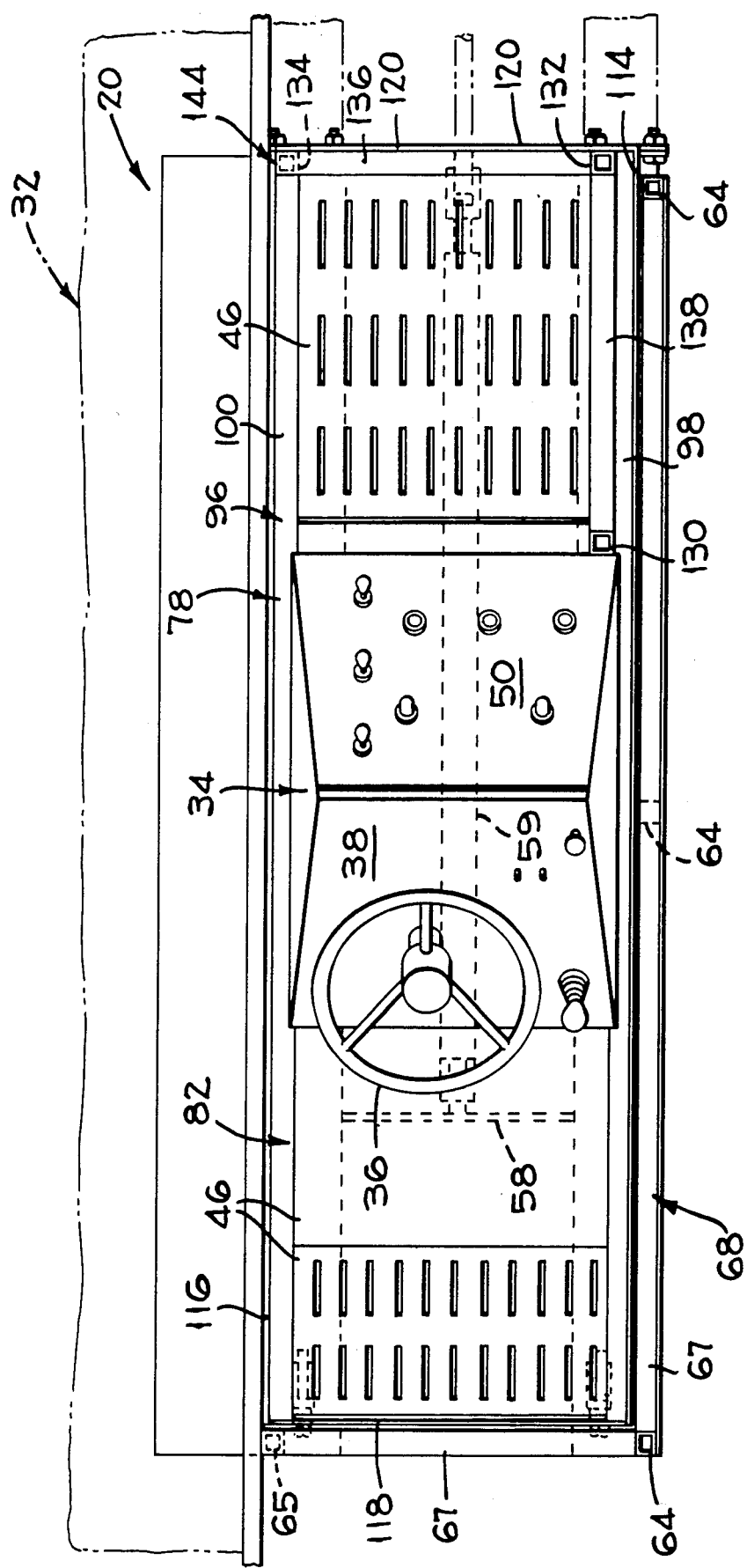

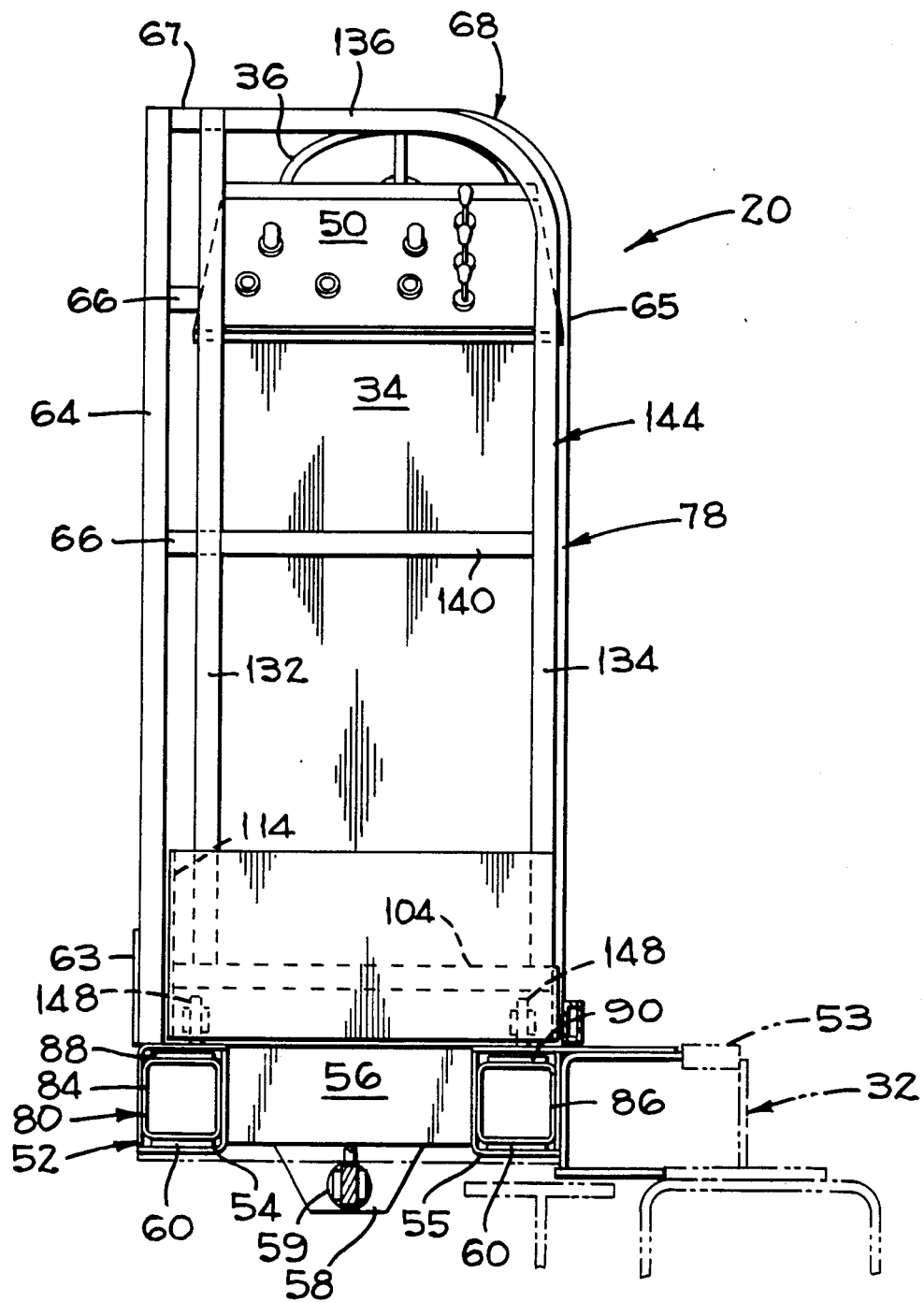
FIG_5

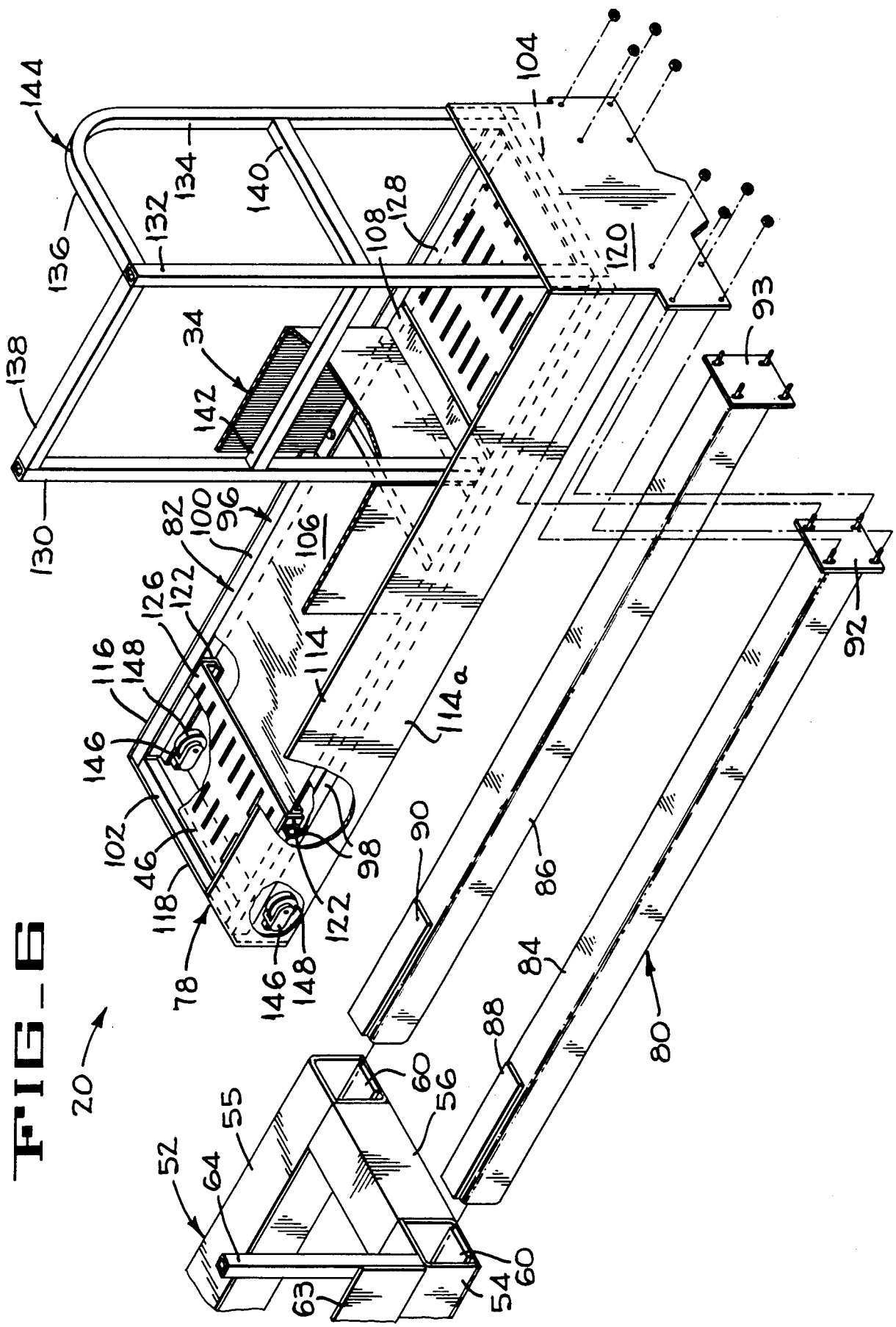

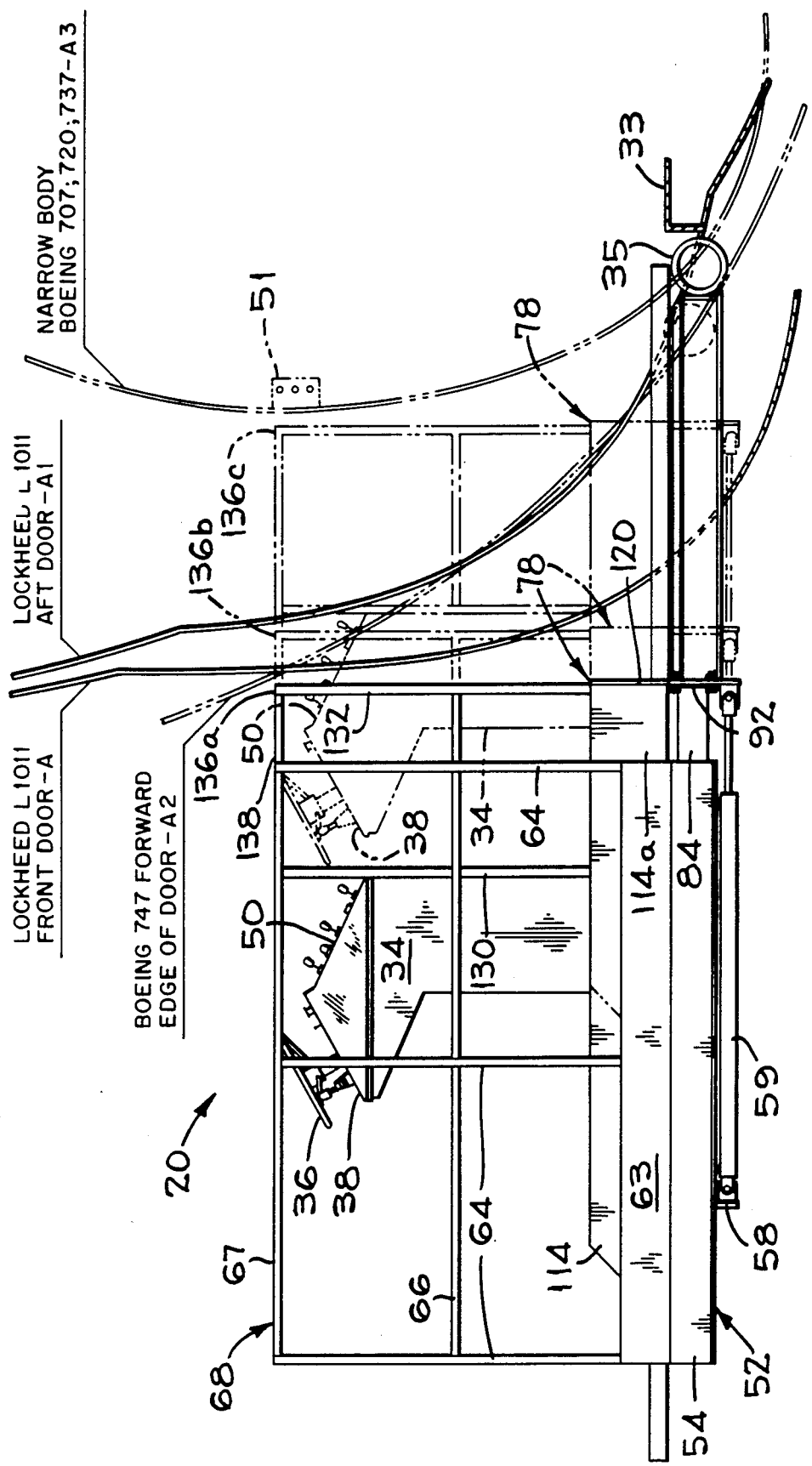

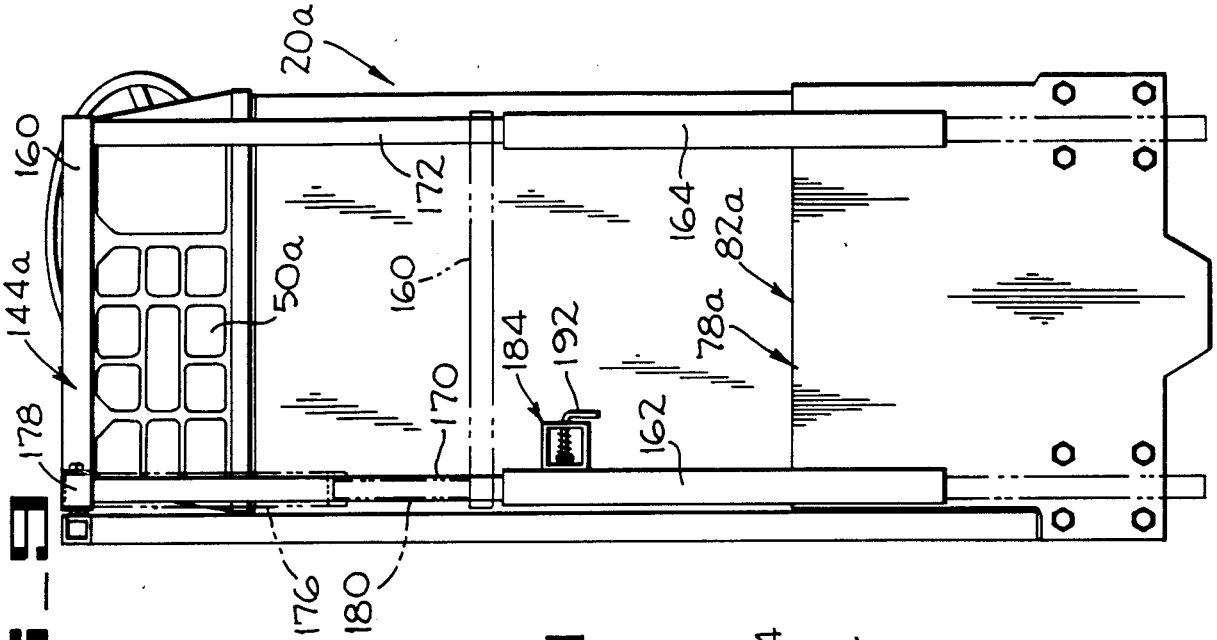
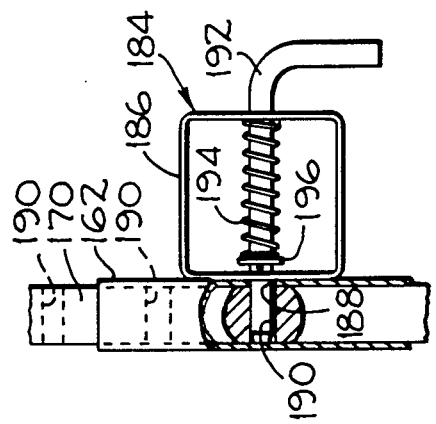
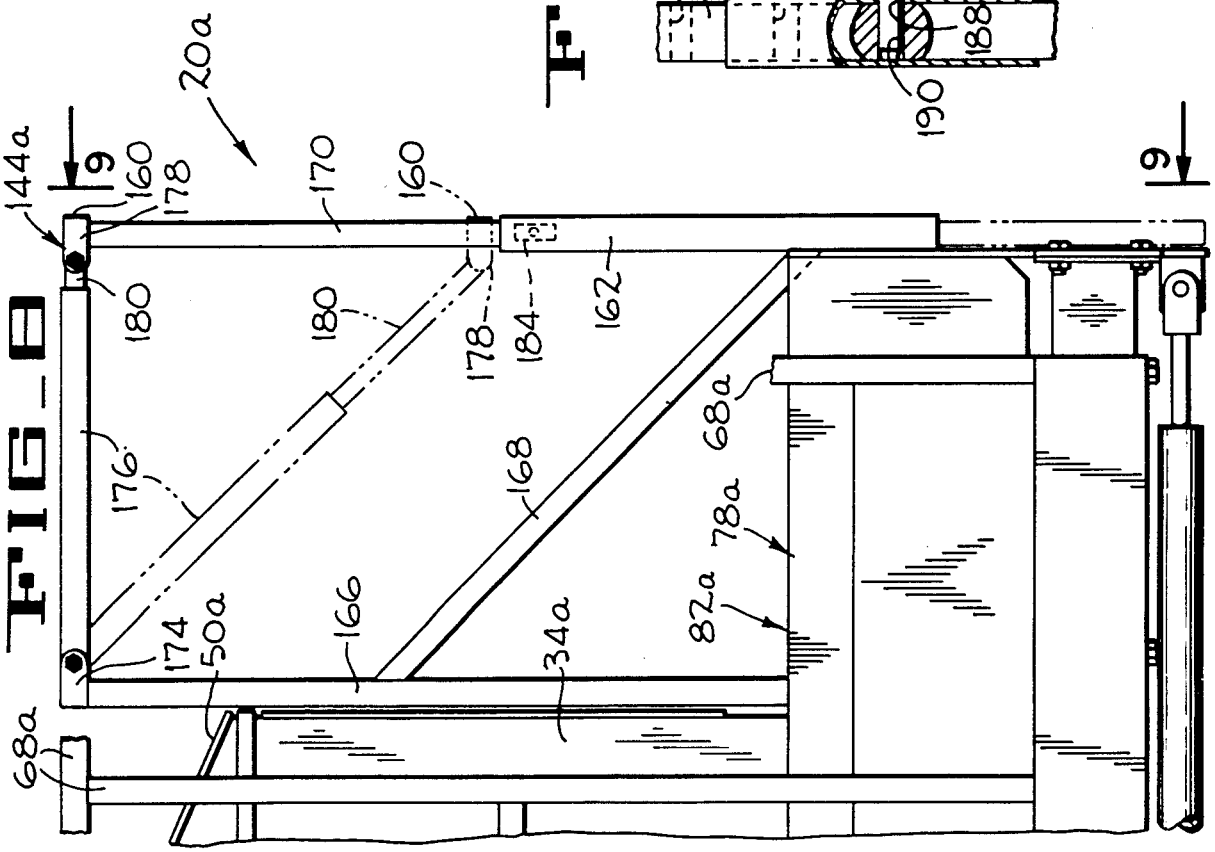

ADJUSTABLE CONTROL STATION FOR AIRCRAFT LOADER

CROSS REFERENCE TO RELATED APPLICATION

The present invention is adapted for use in an aircraft loader of the type disclosed in William C. Dean Application Ser. No. 007,867, filed on Jan. 28, 1987 entitled "Modular Aircraft Loader" and assigned to the Assignee of the present invention. The Dean et al. Application is incorporated by reference herein.

BACKGROUND OF THE INVENTION

FIELD OF THE INVENTION

The present invention relates to a simple and inexpensive adjustable control station, and more particularly relates to an adjustable control station for a mobile aircraft loader which permits an operator to move the control station from a rearward driving position spaced a substantial distance from the front of the loader to a position wherein the operator is supported to conveniently reach and manipulate both the container conveying controls on the loader and also those controls within the cargo opening of the aircraft.

DESCRIPTION OF THE PRIOR ART

Aircraft loaders such as that disclosed in Assignee's Guyaux U.S. Pat. No. 3,666,127 require either separate operators to operate conveyor controls in the aircraft and on the loader, or require the operator to walk on the front platform of the loader when in loading-unloading position at the cargo opening of an aircraft in order to reach the controls for the cargo conveying system within the aircraft. Such arrangements are inconvenient and inefficient requiring either additional personnel or consuming time in an unproductive manner.

SUMMARY OF THE INVENTION

The adjustable control station of the present invention is of unique construction and is especially adapted for use on aircraft loaders or the like which transfer containers between the loader and the cargo floor within an aircraft. The cargo floor in the aircraft is preferably power driven for moving containers to desired positions while in the aircraft. Since modern aircraft vary considerably in size and shape, and since the front platform of the loader must be immediately adjacent the cargo opening in the aircraft before transferring containers, the control station of the loader must be bodily moved independently of the front platform toward or away from the aircraft in order to enable the operator to reach both the aircraft's conveying controls and also the loader's conveying controls. It is desirable for the operator to look forward when driving the loader from place to place, and to look rearwardly and be immediately adjacent the front end of a loader when operating the loader and aircraft conveying controls. Accordingly, a console having two instrument panels thereon is provided with vehicle propulsion controls on a rear panel and container conveying controls on a front instrument panel.

BRIEF DESCRIPTION OF THE DRAWINGS

FIG. 1 is a perspective of an aircraft loader with the adjustable control station of the present invention in its retracted position.

FIG. 2 is a perspective of the adjustable control station in a partially extended position.

FIG. 3 is an enlarged side elevation with parts cut away with the control station in its fully retracted position.

FIG. 4 is a plan of the control station in its retracted position looking in the direction of arrows 4—4 of FIG. 3.

FIG. 5 is a section taken along lines 5—5 of FIG. 3 illustrating tubular mountings for the movable portion of the station.

FIG. 6 is an exploded perspective illustrating the unique construction of the control station.

FIG. 7 is an operational view in side elevation of the control station shown in several operative positions relative to the cargo receiving area of different types of aircraft.

FIG. 8 is a side elevation of the front portion of a second embodiment of the adjustable control station featuring a vertically adjustable inner handrail, portions of an outer handrail being cut away.

FIG. 9 is an end view of FIG. 8 looking in the direction of arrows 9—9 of FIG. 8.

FIG. 10 is an enlarged end elevation illustrating a latch.

DESCRIPTION OF THE PREFERRED EMBODIMENT

The adjustable control station 20 (FIGS. 1 and 2) of the present invention is mounted on a mobile aircraft loader 22. The loader 22 includes a chassis 24 supported on a pair of rear wheels 26, a double-wheeled bogie arrangement being substituted for each rear wheel 26 when the weight of the loader 22 causes the load-carrying capacity of a single wheel to be exceeded, and a pair of front steerable wheels 28 which are driven by an engine and conventional controls (not shown). The engine also drives a hydraulic pump (not shown) which provides fluid for operating a plurality of container conveying systems as fully disclosed in the aforementioned William C. Dean application.

In brief, the loader 22 (FIG. 1) includes a rear platform 30 and a forward platform 32, each of which is raised a substantial distance from their illustrated lowermost positions into horizontal alignment with a horizontal drivable aircraft conveying system 33, only a fragment of a frame being shown in FIG. 7.

When the aircraft loader 22 is to be driven into loading position (or out of loading position) with the cargo opening of one of a plurality of aircrafts A, A1, A2 or A3 (FIG. 7) to be loaded or unloaded, the operator stands behind a console 34 having a steering wheel 36 and engine controls on a rear instrument panel 38. A brake pedal 40 (FIG. 3) and a pedal 42 for a forward and reverse hydrostatic drive system (not shown) are movably mounted on a non-skid floor 46 of the adjustable control station 20. The loader 22 is then leveled and locked in transfer position by a plurality of hydraulic jacks (not shown).

Power driven container supporting conveyors (not shown) on each platform 30, 32 are both elevated to the level of the aircraft conveying system 33 with a resilient bumper 35 positioned as illustrated in FIG. 7. The operator then moves forwardly of the console 34 and then actuates controls on a forward instrument panel 50 which will orient and drive the containers in selected directions while on the front and rear platforms 30, 32. When a container C is transferred between the front platform 32 and the aircraft conveying system 33, the operator may simultaneously control the movement of the front platform system from controls on the forward instrument panel 50 on the loader, and controls on an instrument panel 51 of the aircraft which controls the direction of movement of the container C while in the aircraft A. For simplicity, the location of the instrument panel on the aircraft is only shown in regard to the narrow body aircraft A3 (FIG. 7). It will be understood, however, that each aircraft has similar conveyor controls thereon.

The adjustable control station 20 includes a horizontal lower frame 52 (FIGS. 5 and 6) which is rigidly secured to the right side wall 53 of the front platform. The frame 52 includes a pair of longitudinally extending outer rectangular tubes 54,55 preferably formed from two angle members welded together. The outer tubes are welded to transverse end tubes 56 (only one being shown) and to a transverse plate 58 (FIGS. 3, 5 and 7) to which one end of a hydraulic cylinder 59 is pivotally connected. An elongated non-metallic (preferably polytetrafluroethylene) bearing strip 60 is removably secured to the lower inner wall of each tube 54,55. An outer kick plate 63 and a plurality of outer handrail posts 64 are welded to the outer tube 54. As best shown in FIG. 4, an additional handrail post 65 is welded to the rear end of tube 55. Intermediate horizontal rails 66 and top rails 67 are welded to the posts 64,65 to define an outer handrail 68 which functions as a support for the operator's body as well as providing convenient reference surfaces to limit and direct the operator's own movement during loading-unloading operations when his or her attention is concentrated on the movement of containers.

A movable portion 78 (FIG. 6) of the control station 20 is formed from; a telescopic slide mechanism 80, and an operator supporting control platform 82 which is bolted to the mechanism 80 during final assembly.

The telescopic slide mechanism 80 includes two rectangular tubes 84, 86 having non-metallic (preferably polytetrafluroethylene) bearing pads 88, 90 secured to the upper surfaces of the rear ends thereof as by bolting. The rear or free ends of the tubes 84, 86 are slidably received within the outer tubes 54, 55 and have their forward ends welded to plates 92 and 93. The plates are slotted vertically to permit adjustment for manufacturing variations.

The adjustable operator supporting control platform 82 comprises a rectangular frame 96 having a pair of longitudinal tubular side beams 98, 100 welded to a pair of end beams 102, 104 and reinforced by transverse channel members 106, 108. An elongated kickplate 114 is welded to the right side beam 98 and includes a skirt 114a which projects downwardly therefrom. Downwardly extending skirts 116, 118 are also welded to the left side beam 100 and the end beam 102, respectively. The front end beam 104 has a vertically extending plate 120 welded thereto which is bolted to the plates 92 and 93 by bolts passing through the vertical slots during final assembly. A pair of spaced angle members 122 (only one pair being shown in FIG. 6) are welded to the longitudinal side beams 98, 100 and receive floor gratings 126, 128, respectively.

The previously described instrument supporting console 34 is bolted to the channel members 106, 108; and three front handrail posts 130, 132, 134 are welded to the operator's control platform 82 with the post 134 being bent to define a curved front end hand rail 136 which cooperates with a longitudinally extending rail 138 and with intermediate rails 140, 142 to define a movable inner handrail 144.

A pair of rollers 148 are journaled in yokes 146 to the rear skirt 118. In order to assemble the movable portion 82 of the control station on the loader 22, the telescopic slide mechanism 80 is inserted into the tubes 54 and 55, the plates 92, 93 and 120 are bolted together with the rollers 148 rotatably supported on the upper surface of the tubes 54 and 55, and the hydraulic cylinder 59 is connected between the plates 58 and 120.

When the operator is in an aircraft loader driving position behind the console 34, the console and the outer handrail 68 restrain and direct his or her own movement; and when in a conveyor controlling position forwardly of the console 34, the console, the end handrail 136 and the inner handrail 138 also cooperate to restrain and direct his or her movement. For the operator's comfort, the hand rail, which would contact the body may be encased in soft rubber tubing.

As illustrated in FIG. 1, a two piece telescoping ladder 150 is provided to enable the operator to climb onto the front platform 32 when in its lowered position as shown in FIG. 1, or when in any one of a plurality of raised positions (not shown).

In operation, an operator climbs the ladder 150 (FIG. 1) to reach the front platform 32 of the aircraft loader 22 and stands on the adjustable control platform 82 rearwardly of the console 34. He then actuates controls on the rear instrument panel 38 (FIG. 3) and on the platform 82, such as the brake pedal 40 and the hydrostatic drive pedal 42, to drive the aircraft loader 22 into alignment with and closely adjacent the cargo opening of an aircraft, for example a narrow bodied aircraft A3 (FIG. 7). When driving the loader 22 into loading position, the adjustable control portion 78 is in its fully retracted position as shown in solid lines in FIG. 1. The operator then actuates controls in the rear instrument panel 38 to raise the front platform to the level of the aircraft conveying system 33 with the resilient bumper 35 positioned as shown in FIG. 7.

The operator then actuates controls on the rear instrument panel 38 which activates the hydraulic cylinder 59 to move himself and the movable portion 78 of the control station 20 forwardly until the curved front handrail 136 is disposed immediately adjacent the aircraft. For example, if the front cargo opening of aircraft A, or the cargo opening of aircraft A2 are to receive or discharge containers, the operator actuates controls causing the cylinder 59 to move the curved front handrail 136 to the solid line position identified as 136a. If the aft door of the aircraft A1 is to receive or discharge containers C, the hydraulic cylinder 59 moves the curved front handrail to position 136b; and if a narrow body aircraft A3 is to receive or discharge containers C, the curved front handrail is moved to position 136c.

When the movable portion 78 of the control station 20 is in the loading-unloading position, the operator moves forward of the console so that he can operate the conveyor systems on the loader by actuating controls on the forward instrument panel 50; and can also easily reach and actuate controls on the aircraft control panel, such as panel 51 in an aircraft A3.

Thus, the operator may simultaneously control the movement of containers within the aircraft and/or the front or rear platforms of the loader 20 while safely positioned within the forward handrails 144, 136 at a location where he can easily observe the movement of the containers on both the loader and aircraft.

It will be understood that the term "containers" as used in the specification and claims is intended to include all types of flat bottomed articles including pallets and boxes or the like.

A second embodiment of the adjustable control station 20a (FIGS. 8-10) of the present invention is substantially the same as the first embodiment except for a modified inner handrail 144a. Accordingly, components of the second embodiment which are equivalent to those of the first embodiment will be assigned the same numerals followed by the letter "a".

The outer handrail 68a is substantially the same as that of the first embodiment and is partially cut away in FIG. 8 to better illustrate an inner handrail 144a.

The inner handrail 144a (FIGS. 8-10) is supported by an adjustable control station 20a and is slidably received on a movable operators supporting control platform 82a. The movable control platform 82a also supports a console 34a having a rear instrument panel (not shown) and a forward instrument panel 50a.

The inner handrail 144a includes a front end rail 160 which is vertially movable between a raised position and a lowered position as illustrated in solid lines and dotted lines in FIGS. 8 and 9, respectively.

When in its lowered position it will be apparent that the front rail 160 may be moved into registration with the cargo openings of aircraft which have lower than normal cargo openings; and/or which have cargo bodies which curve sharper than those illustrated in FIG. 7. Also, lowering of the front rail will enable the operators, especially short operators, to reach further into the aircraft to actuate controls and to better observe the movement of containers in the aircraft.

The inner handrail 144a comprises a pair of short vertically extending tubular handrail posts 162, 164 and a taller handrail post 166 rigidly secured to the operators platform 82a. A diagonal brace 168 is secured between the posts 162 and 166 to strengthen the same.

A pair of upstanding rods 170, 172 are slidably received in the tubes 162, 164, respectively, with the rod 172 being rigidly secured to one end of the front end rail 160. A first hinge bracket 174 is rigidly secured to the tall post 166 and is pivotally connected to one end of a tubular side rail tube 176. A second hinge bracket 178 is rigidly connected to the rod 170 and is pivotally connected to a rod 180 which is slidably received within the side rail tube 176.

A latch 184 (FIGS. 9 and 10) includes a rectangular body 186 rigidly secured to the tube 162 and has a pair of holes therein in alignment with a hole 188 in the tubular member 162. A plurality of holes 190 are provided in the rod 170 to receive one end of a locking pin 192. The pin 192 is urged into a preselected hole 190 by a spring 194 disposed between one wall of the body 186 and a washer 196 secured to the locking pin.

In operation of the second embodiment of the invention, the control station is first moved adjacent the loading and unloading position with the cargo opening of an aircraft in positions similar to those illustrated in FIG. 7. When needed or if desired the operator may then pull the locking pin 192 out of one of the holes 190 in rod 170 and manually lower (or raise) the front end rail 160 to a suitable elevation to register the front rail with the cargo opening and which will allow him or her to easily reach controls within the aircraft and observe the movements of containers being loaded or unloaded from the aircraft. When the front end rail 160 is in the desired position, the operator allows the locking pin 192 to be spring urged into one of the holes thereby locking the end rail in desired position.

From the foregoing description it is apparent that the adjustable control station for an aircraft loader or the like is of inexpensive and practical design since most parts in each of the three major components are welded together, and the two movable components are then bolted to each other thereby requiring a minimum of effort for assembling and providing a low cost adjustable control station.

Although the best mode contemplated for carrying out the present invention has been herein shown and described, it will be apparent that modification and variation may be made without departing from what is regarded to be the subject matter of the invention.

What is claimed is:

1. In an aircraft loader having a front platform with a power driven first conveyor thereon in container transfer position with a power driven second conveyor in an aircraft having aircraft conveyor control means therein adjacent the cargo opening of the aircraft, the improvement which comprises:
   support means including a pair of elongated tubes extending longitudinally of the aircraft loader and being rigidly secured to said front platform;
   slide means having spaced elongated beams slidably received within said elongated tubes;
   connecting means for connecting adjacent ends of each beam together;
   movable platform means having rollers journaled on one end thereof and rotatably supported on said tubes, said platform means having an end portion secured to said connecting means;
   first power means operatively connected between said supporting means and said platform for reciprocating said platform relative to said tubes between a retracted and an extended position;
   a first control means on said platform for controlling the direction of movement of said platform; and
   second control means on said aircraft for controlling said conveyor in said aircraft, said first and second control means being within reach of an operator on said aircraft loader to control the movement of the container while being conveyed by said first and second conveyors.

2. An apparatus according to claim 1 and additionally comprising power means for raising and lowering said front platform by actuating selected ones of said first control means to position the first conveyor at the level of the second conveyor in a plurality of different aircrafts thereby enabling the operator to load a plurality of aircrafts having cargo engines and second conveyor means therein at different heights.

3. An apparatus for translating a platform between an extended and a retracted position, comprising:
   support means including a pair of parallel elongated rectangular tubes for supporting said platform for movement between an extended and a retracted position;
   bearing strips removably secured to the lower inside surface of said rectangular tubes;
   slide means including spaced elongated rectangular beams having free ends slidably received within said elongated rectangular tubes and rigidly connected to said platform;

bearing pads rigidly secured to the upper surface of said free ends of each of said slide means;

connecting means for connecting adjacent outer ends of each beam together;

platform supporting means movably supporting one end of the platform on said tubes, said platform means having another end portion secured to said connecting means, said platform supporting means being movably supported on the upper surface of said tubes;

first power means underlying said platform support means and operatively connected between said support means and said platform for reciprocating said platform relative to said tubes; and first control means on said platform for controlling the direction of movement of said platform.

4. An apparatus according to claim 3 wherein said platform supporting means includes a pair of rollers which roll upon the upper surfaces of said rectangular tubes at a location above said bearing pads.

5. An apparatus for translating a platform between an extended and a retracted position, comprising:

support means including a pair of parallel elongated tubes for supporting said platform for movement between said extended and retracted position;

slide means having spaced elongated beams slidably received within said elongated tubes and rigidly connected to said platform;

connecting means for connecting adjacent ends of each beam together;

platform supporting means movably supporting one end of a platform on said tubes, said platform means having another end portion secured to said connecting means;

first power means operatively connected between said support means and said platform for reciprocating said platform relative to said tubes;

first control means on said platform for controlling the direction of movement of said platform;

a handrail supported on said platform and including an upstanding post, an upper side rail, and an upper end rail;

means for locking said upper end rail in one of a plurality of vertical positions for more easily enabling the operator to observe and control the movement of the articles on said first and second conveyors;

said handrail also includes a pair of upstanding tubes rigidly secured to said platform, a pair of upstanding rods slidably received in said upstanding tubes and having their upper ends rigidly secured to said end rail, said upper side rail further including said tubular portion and a rod slidably received therein with said tubular portion and the slidable rod being pivotally connected between said post and said upper end rail, and latch for latching said upper and rail at a selected elevation relative to said platform.

* * * * *